J. F. McCLURE.
Velocipedes.

No. 144,551.

Patented Nov. 11, 1873.

Witnesses
John A. Ellis
E. E. Ellis

Inventor
James F. McClure
Per
T. H. Alexander &c
Atty's

UNITED STATES PATENT OFFICE.

JAMES F. McCLURE, OF CONNERSVILLE, INDIANA.

IMPROVEMENT IN VELOCIPEDES.

Specification forming part of Letters Patent No. 144,551, dated November 11, 1873; application filed August 2, 1873.

*To all whom it may concern:*

Be it known that I, JAMES F. MCCLURE, of Connersville, in the county of Fayette and State of Indiana, have invented certain new and useful Improvements in Mode of Propelling Carriages; and I do hereby declare that the following is a full, clear, and exact description thereof, reference being had to the accompanying drawings and to the letters of reference marked thereon which form a part of this specification.

The nature of my invention consists in the construction and arrangement of a mechanism for propelling vehicles, as will be hereinafter more fully set forth.

In order to enable others skilled in the art to which my invention appertains to make and use the same, I will now proceed to describe its construction and operation, referring to the annexed drawing, in which—

Figure 1:
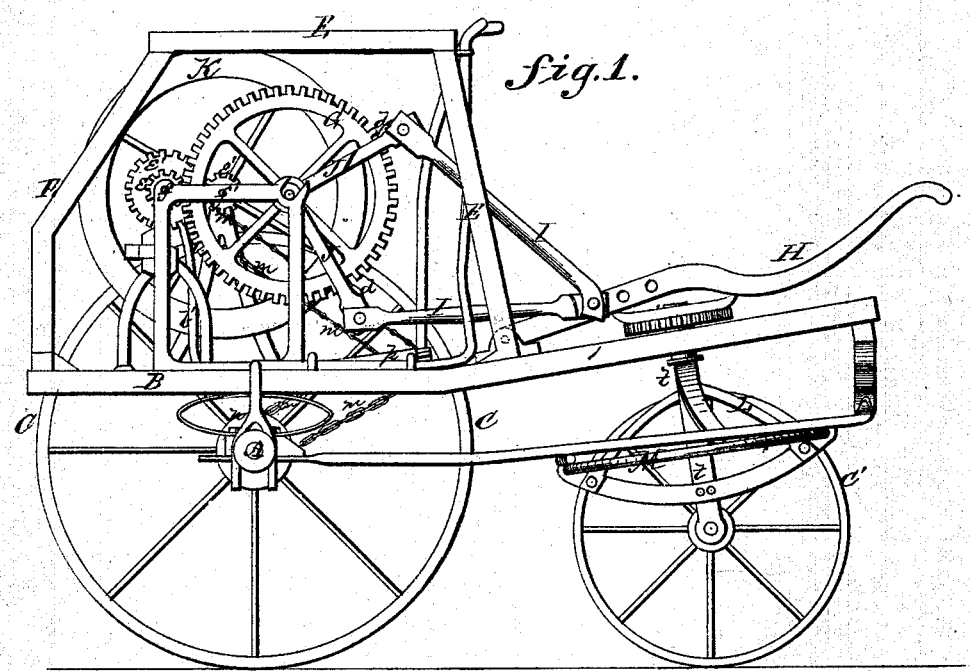
Figure 2:
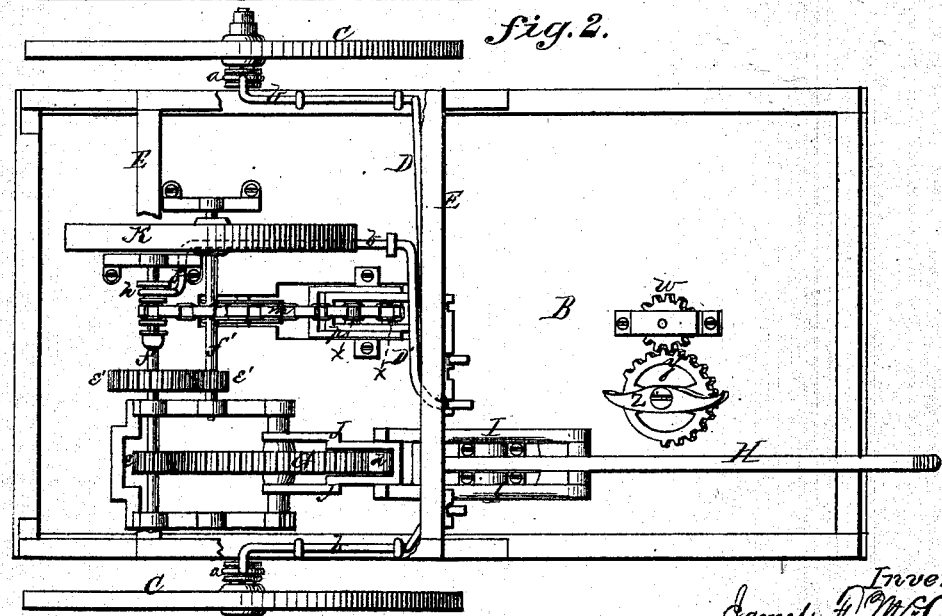

Figure 1 represents a side elevation; and Fig. 2 is a plan view.

A represents the hind axle, passing through and revolving in suitable boxes, which are, by the usual elliptic or other carriage springs, connected with the bottom B of the vehicle. C C are the driving-wheels, placed upon the ends of the axle A, and each wheel has a clutch, $a$, connected, by a rod, $b$, with a lever, D, by means of which the wheels are thrown in and out of gear with the revolving axle. On the rear part of the bottom B, under the seat-frame E, is erected suitable frame-work for containing the various working parts of my machine. In this frame is a large cog or master wheel, G, which is revolved by moving a lever, H, back and forth, the lower end of said lever being pivoted to the bottom B, immediately in front of the seat-frame E. To the lever H are, by one bolt, pivoted four arms, I I, two on each side. The upper and lower pairs of these arms are pivoted, at their outer or front ends, respectively, to the outer ends of an upper and lower frame, J, the inner ends of which are hung on the shaft of the master-wheel G. In the outer end of each frame J is a pawl, $d$, which are so arranged that, when moving the lever H backward, the upper pawl will engage with the wheel G and turn it, while the lower pawl will slip over the wheel; and, when moving the lever H forward, the upper pawl will slip, and the lower pawl revolve the wheel. The master-wheel G gears with and revolves a pinion, $e$, and shaft $f$, on which said pinion is secured. This shaft is, by gearing $e'$ $e'$, connected with a shaft, $f'$, upon which the fly-wheel K is fastened. On the shaft $f$ is a common clutch, $h$, the movable part of which is, by a rod, $b'$, connected with a lever, D', for throwing it in and out of gear. To this movable part of the clutch is attached a pulley, around which passes an endless chain, $m$, which also passes around a pulley, $n$, on the axle A, thus, when the clutch $h$ is in gear, communicating motion to the axle; and, when the clutches $a$ $a$ are in gear, also to the wheels C C, propelling the vehicle. The endless chain $m$ passes over two rollers, $x$ $x$, in a frame, $p$, which is arranged in a slot in the bottom B, and adjusted by a set-screw, $s$, so as to tighten the chain. C' represents the front wheel arranged in a curved frame, L, which turns on an upright shaft, $t$, being guided by a circle or fifth wheel, M. To the upper end of the shaft $t$ is attached a pinion, $w$, gearing with another pinion, $y$, upon which is a lever, $z$, arranged to be operated on by the feet of the operator.

Having thus fully described my invention, what I claim as new, and desire to secure by Letters Patent, is—

1. The endless chain $m$, rollers $x$ $x$, frame $p$, axle-pulley $n$, and set-screw $s$, in combination with the wheel G, pinion $e$, and shaft $f$, as and for the purpose specified.

2. The combination of the wheel G with pinion $e$, shafts $f$ $f'$, gears $e'$ $e'$, fly-wheel K, clutch $h$, endless chain $m$, and pulley $n$ on the axle A, all as and for the purposes herein set forth.

In testimony that I claim the foregoing as my own I affix my signature in presence of two witnesses.

JAMES F. McCLURE.

Witnesses:
 JOSEPH M. WEBSTER,
 PERRY O. UPDEGRAFF.